INVENTORS
MICHAEL P. FEDOCK &
THEODORE G. KOHL
BY
Ward, Haselton, McElhannon,
Orme, Brooks & Fitzpatrick
ATTORNEYS

United States Patent Office 3,519,386
Patented July 7, 1970

3,519,386
PROCESS FOR PRODUCING A DICALCIUM
FERRITE SINTERED PRODUCT
Michael P. Fedock and Theodore G. Kohl, Cleveland,
Ohio, assignors to Republic Steel Corporation, Cleveland, Ohio, a corporation of New Jersey
Filed Nov. 23, 1965, Ser. No. 509,303
Int. Cl. C01f 11/00; C01g 49/00
U.S. Cl. 23—51     10 Claims

ABSTRACT OF THE DISCLOSURE

Process for providing a dicalcium ferrite sintered product which consists in admixing iron ore with a solid carbonaceous fuel havng a particle size of not more than 1/8" and not less than 100-mesh, admixing the ore plus fuel mixture with limestone in stated proportion, and igniting and sintering the mixture.

---

Figure 1:
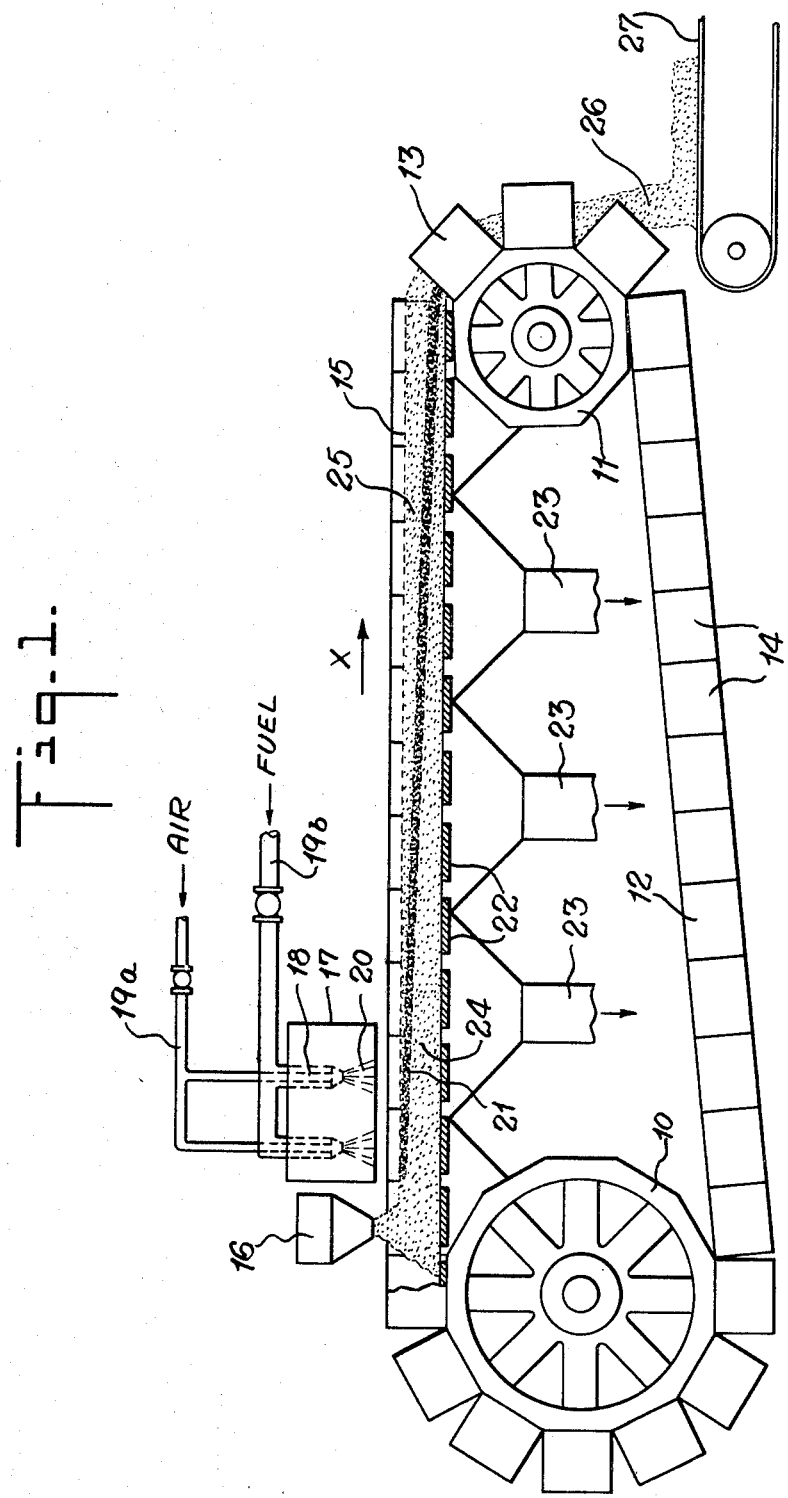

This invention pertains to a process for producing a sintered product consisting predominantly of dicalcium ferrite, $2CaO \cdot Fe_2O_3$, and to the resultant sintered product.

Such product is of great utility as a feedstock and/or conditioner for blast, electric, open hearth and basic oxygen furnaces for the reason that it carries lime and iron units in a weather-resistant form into the furnace instead of just lime CaO and undesirable carbon dioxide $CO_2$ as does limestone $CaCO_3$. Thus, its value lies in its high flux content plus a bonus of iron units when it is used as the substitute for limestone in the furnace burden.

Conventional iron ore sinters fall into three general categories: (1) Non-fluxed or those which contain little, if any, basic oxides to neutralize the acidic oxide gangue material; (2) fluxed, up to self-fluxing, or those which contain basic to acidic oxides in the range from 0.2:1 up to 1:1; (3) super-fluxed or burden-fluxing sinters which contain a sufficient amount of excess basic oxides to flux the acidic oxides from other sources (largely coke) in the burden of the furnace. Such sinters for a 70+ percent sinter burden usually have a base-acid ratio of about 1.3:1. Our investigations on sinters have established that there is a general tendency to increased production and a more reducible product but a decrease in strength and unpredictable weatherability in going from a non-fluxed to a burden-fluxed sinter composition. Attempts at super-fluxing beyond burden-fluxing composition have met with severe difficulties with over-fusing and slagging reactions on burning. We have found as discussed more fully hereinafter that this is associated with a low melting composition trough which corresponds with formation of large amounts of monocalcium ferrite ($CaO \cdot Fe_2O_3$). However, with further addition of lime to produce essentially all dicalcium ferrite ($2CaO \cdot Fe_2O_3$), this low melting trough is avoided and the sintering behavior returns to that resembling fluxed sinter compositions.

We have found that the dicalcium ferrite sinter compositions of the present invention will burn at an equal or better rate than fluxed sinters, and also have significantly higher strength and reducibility, together with good resistance to weathering.

Ferrite sinter compositions are derived from mineralic phase compositions of the product, not from base-acid ratios. From mineral phase equilibrium and actual petrographic examination we have found that dicalcium ferrite sinters are produced when sufficient lime is available to form the mineral phases, dicalcium silicate ($2CaO \cdot SiO_2$), brown millerite $4CaO \cdot Fe_2O_3 \cdot Al_2O_3$ and dicalcium ferrite $2CaO \cdot Fe_2O_3$. These minerals form in the order listed. With a deficiency of lime, monocalcium ferrite ($CaO \cdot Fe_2O_3$) forms at the expense of dicalcium ferrite. Actually, because of the limited time of these reactions during the sintering burn, unreacted-free lime and both forms of iron oxide, hematite and magnetite, are observed in variable amount in the sinter product. Nonetheless, with adequate lime, dicalcium ferrite is the major phase observed. With this information resulting from our investigatons, we have derived the formula set forth below to calculate the limestone requirement of a sinter mix consisting in addition to the limestone, of ore and a solid carbonaceous fuel, such as coke. This formula which is based on a dry weight percent analysis is as follows:

$$\frac{\text{weight of limestone}}{\text{weight of ore and fuel mix}} = $$

$$\frac{[\%\,Fe - 7 + (1.867 \times \%\,SiO_2) + (1.1 \times \%\,Al_2O_3) - \%\,CaO]\ \text{in ore and fuel mix}}{[\%\,CaO - \%\,Fe - (1.867 \times \%\,SiO_2) - (1.1 \times \%\,Al_2O_3)]\ \text{in limestone}}$$

Magnesia is not included in this formula since its behavior is not as predictable as lime under the varying atmosphere obtained during a sintering burn. This applies also to the other minor constituents in the raw materials. By ignoring magnesia, the calculated lime requirement tends to an excess which errs in a safe direction away from the low melting monocalcium ferrite trough which must be avoided in producing this type of sinter.

We have further found that the most critical material in any sinter mix is the nature, distribution, and amount of fuel. When coke breeze is used, its sizing is critical. This can be neither too coarse (greater than 1/8") nor too fine (less than 100 mesh). Ideally, a sizing which would fall within these limits can be obtained by rod milling. Coarse breeze prolongs the combustion while fine dusty breeze burns too rapidly to effect the desired sintering reactions. Dicalcium ferrite sintering requires an increased amount of solid fuel in the form of coke breeze to handle the increased fuel requirement for calcination of limestone. Such fuel should be of minus 1/8" non-dusty sizing.

From thermochemical considerations it can be shown that iron oxide diffuses faster into lime than into iron oxide. Since large amounts of lime must be heat reacted with iron oxide in the production of dicalcium ferrite sinter, the ore should be fine and the limestone preferably coarse to favor the reaction. The ore should be minus 1/4" and the range down to fine dust. The limestone can be minus 1/4" but, like coke breeze, have a minimum of minus 100 mesh dust.

Our investigations in deriving the above formula have established that sinter mix compositions to produce predominantly dicalcium ferrite sinter, contain from 50–55% of limestone, 6–10% of carbonaceous fuel and 35–40% of iron oxide by weight of the total ore-fuel-limestone mix, depending on the analysis of the ore and limestone. A preferred admixture consists of about 55% limestone, 7% coke and 38% iron ore, each by weight of the total. Thus the weight of the carbonaceous fuel will range from about 15–25% of the weight of the ore.

Mix moisture is equally as important as carbon in making good sinter. The sinter burns best when the feed appears to be over-wet or glistening with moisture. Ignition time is also a controlling factor in producing the dicalcium ferrite sinter of the invention. The ignition time should be for about 3 minutes at an ignition temperature of about 2000–2300° F., the resultant sintering temperature due to burning of the carbonaceous fuel, being about 2600–2800° F.

By way of exemplifying the production of a sinter in accordance with the invention consisting predominantly of dicalcium ferrite, reference is first made to the following Table I for an explanation as to the raw materials and determination as to the amounts of each employed:

TABLE I.—SINTER MIX CALCULATION FOR DICALCIUM FERRITE (C₂F) SINTER

| Base Mix | Percent or #/100 # Mix | Fe | Al₂O₃ | SiO₂ | Mn | P | CaO | MgO |
|---|---|---|---|---|---|---|---|---|
| Brown ore, percent | | 49.16 | 3.18 | 10.19 | .89 | .73 | | |
| | 48.0 | 23.60 | 1.52 | 4.89 | | | | |
| Algerian ore, percent | | 55.0 | 3.25 | 3.25 | 1.8 | .007 | 5.25 | 1.25 |
| | 15.0 | 8.25 | .48 | .48 | | | .79 | |
| Aniline sludge, percent | | 62.0 | .87 | 2.96 | .17 | .076 | | |
| | 7.0 | 4.34 | .06 | .20 | | | | |
| Flue dust, percent | | 42.38 | 3.77 | 12.60 | | | 4.09 | 1.38 |
| | 15.0 | 6.36 | .56 | 1.89 | | | .61 | |
| Coke breeze, percent | | 1.20 | 4.20 | 7.61 | | .10 | .02 | .02 |
| | 15.0 | .18 | .63 | 1.14 | | | | |
| Total # Fe, Al₂O₃, SiO₂, & CaO/100.0# Base Mix | | 42.73 | 3.25 | 8.60 | | | 1.40 | |
| Limestone analysis, percent | | | 0.58 | 1.02 | | | 51.18 | 2.95 |

$$\text{Limestone}/100\text{\# of Base Mix} = \frac{42.73\,(\text{Fe})+[8.60\,(\text{SiO}_2)\times 1.867]+[3.25\,(\text{Al}_2\text{O}_3)\times 1.1]-1.40\,(\text{CaO})}{51.18\,(\text{CaO in limestone})-[(1.02\,\text{SiO}_2\times 1.867)+(.58\,\text{Al}_2\text{O}_3\times 1.1)]} = 125\text{\# Limestone}$$

Calculated Mix for C₂F = Orig. Base 100# Mix+125# Limestone Addition equals 225# Total Yield lbs/100# of C₂F Mix Based on Above Analysis as follows:

| | | | | | | | | | |
|---|---|---|---|---|---|---|---|---|---|
| Brown Ore | 21.3 | | 10.5 | .68 | 2.33 | .19 | .15 | | |
| Algerian | 6.7 | Ore | 3.66 | .22 | .22 | .12 | | .35 | .07 |
| Aniline | 3.1 | 37.8 | 1.93 | .03 | .09 | .01 | | | |
| Flue Dust | 6.7 | | 2.82 | .25 | .84 | | | .28 | .09 |
| Coke Breeze | 6.7 | 6.7 | .08 | .28 | .51 | | .02 | | |
| Limestone | 55.5 | 55.5 | .08 | .21 | .57 | | | 28.00 | 1.62 |
| | 100.0 | | 19.07 | 1.67 | 4.56 | .32 | .17 | 29.13 | 1.78 |

Referring to the two lefthand columns at the top of the table, the base mix of raw materials consisted of a mixture of brown ore, Algerian ore, aniline sludge, flue dust and coke breeze in the percentages of each listed in the second column to make up a total of 100% or one hundred pounds of the base mix. The chemical analyses of these various ingredients is given in the third to ninth columns at the top of the chart. At the middle of the chart is given the computation in accordance with the above formula of the amount of limestone required for each 100 pounds of the base mix, the computation showing that 125 pounds of limestone was thus required. The columns at the bottom of the chart give the percentages of each ingredient of the final mix including the limestone and also the final analysis of each constitutent as to content of iron, aluminum oxide, silicon oxide, etc.

For producing the sinter product material of the projected analysis shown, the final mix was progressively fed through a conventional type of sintering equipment, the furnace portion of which was 12 feet in length, heated by flat-flame combustion burners. The ignition hood provided a maximum of 12 million B.t.u.'s of heat per hour or 2777 B.t.u.'s per square foot of strand area per minute of feed. The strand speed was 48 inches per minute so that each portion of the sinter mix was in the combustion zone for a total of about 3 minutes. Under these conditions the heat was sufficient to slag the bed top to blackness. The sinter bed was maintained at a depth of 11 inches.

A continuous pilot test run was made over a one month period on this basis, with resulting production of a total of 17,842 tons of the sinter product. The following Table II gives a statistically-derived analysis of the sinter product obtained as compared with the weighted average derived from turn production and a complete analysis obtained on the sample taken on one day during the test run.

The sinter product was thus found to have the following weighted average composition: iron—32.20%, CaO— 39.53%, MgO—2.88%, SiO₂—6.95%, Al₂O₃—2.22%, and the average flux value 33.2%. It has a flux replacement value of 159 pounds of ferrite per 100 pounds of limestone, 53 available flux). For the entire pilot test run the average pre-sinter mix composition was 55% limestone, 38% iron ore and 7% coke breeze.

Figure 2:
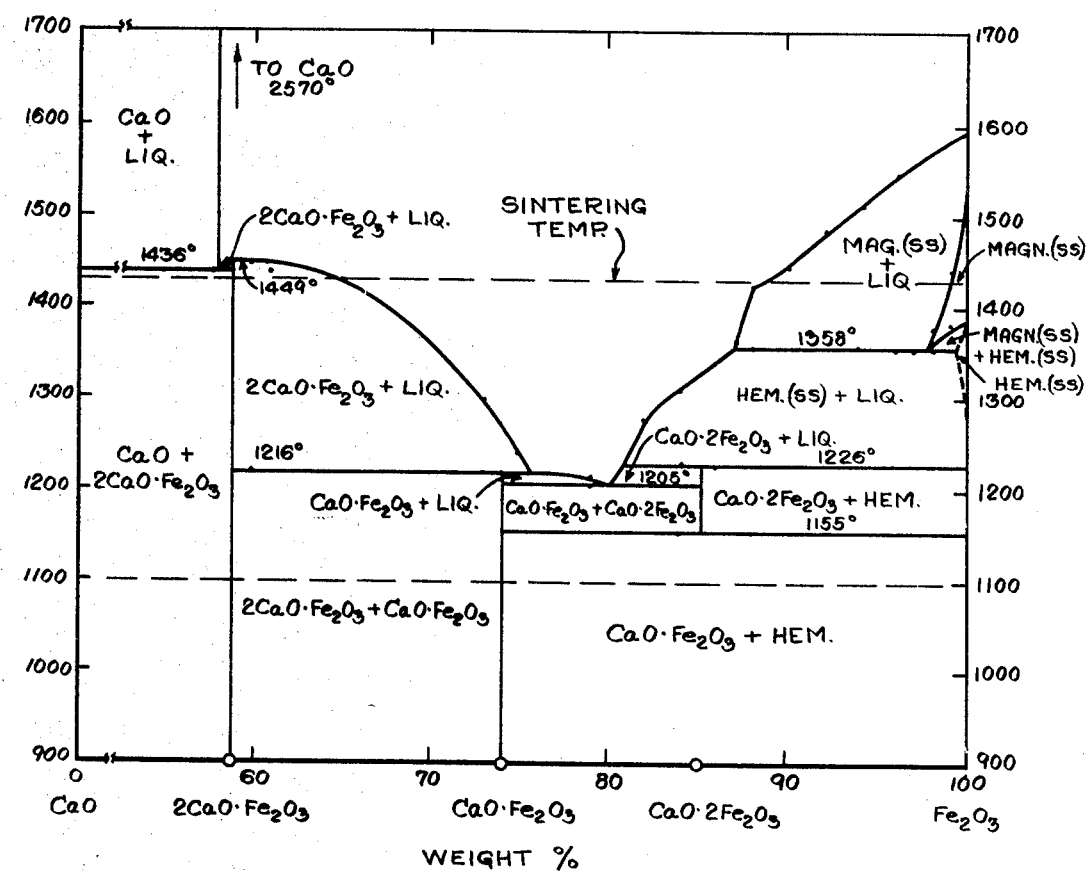

Referring now to the accompanying drawings:

FIG. 1 is a more or less diagrammatic showing in side elevation and partly in longitudinal section of a continuous grate sintering machine adapted for producing dicalcium ferrite in accordance with the invention; and FIG. 2 is a phase diagram illustrating the phase relations in the system CaO-iron oxide in air as a function of temperature, and wherein the percentages of CaO and iron oxide are plotted as abscissae while the temperature in degrees centigrade is plotted as ordinates.

Referring to FIG. 1, the sintering machine comprises a pair of spaced apart sprockets, as at 10, 11, one of which, such as 10, is motor-driven. About these sprockets extends a gas-permeable, travelling grate, endless conveyor 12, which is driven in the direction of the arrow X. The grate is made of articulated links, as at 13, provided with oppositely disposed sidewalls, which during horizontal travel of the grate, form continuous sidewalls, as at 14, for retention of the sinter feed and sinter bed. The mixture of ore, coke and limestone to be sintered is charged into a hopper 16 and discharged thence onto the conveyor 12 to form a bed to the height indicated at 15. The ore-coke-limestone mixture is fed thence beneath a furnace 17 provided with burners, as at 18, supplied with fuel and air over lines 19a, 19b, the flames 20 from which burners are directed downwardly onto the surface of the aforesaid mixture to ignite the surface portion thereof as indicated by the shaded zone 21. As the ore-coke-limestone mixture as thus ignited at about 2000–2300° F. passes beyond the furnace 17 in the direction of the arrow X, the zone of ignition or sintering, the temperature of which extends up to about 2600°

TABLE II

| | Fe | FeO | Fe₂O₃ | CaO | MgO | SiO₂ | Al₂O₃ | MnO | P₂O₅ |
|---|---|---|---|---|---|---|---|---|---|
| Statistical average | 32.52 | | | 39.08 | | 6.83 | 2.17 | | |
| Weighted averaged | 32.20 | | | 39.53 | 2.88 | 6.95 | 2.22 | | |
| Typical | 32.70 | 8.9 | 36.9 | 41.6 | 1.4 | 7.2 | 1.8 | 0.79 | 0.55 |

F., will progress gradually downwardly through the bed from top to base as further indicated by the shaded zone 21 until by the time the admixture has reached the discharge end of the conveyor at sprocket 11, it will have reached the base of the sinter mixture. Meantime, to facilitate such progressive sintering, air is drawn downwardly through the bed and spaced grate bars 22, by means of the windboxes 23 disposed below the conveyor belt and spaced therealong. Thus as the conveyor belt progresses from the feed to the discharge end, the portion of the bed below the sintering zone 21, will be substantially unburned, as at 24, while that above the sintering zone will be the burned sinter bed, as at 25. At the discharge end of the travelling conveyor, the sintered product consisting essentially of dicalcium ferrite will be discharged, as at 26, onto an endless belt conveyor 27.

Referring to FIG. 2, it will be seen that a mixture of iron oxide and lime CaO when subjected to ignition and sintering temperatures over the aforesaid range of 2000–2600° F. or 1100–1425° C., may comprise a solids-liquid mixture, a completely liquid mixture or a completely solids mixture depending on the relative proportions in which the lime and the iron oxide are initially present. Thus as shown in FIG. 2, for proportions of iron oxide between about 88 and 100%, balance lime, the mixture at a sintering temperature of 2600° F. or 1425° C., consists of magnetite in solid solution plus a liquid admixture of iron oxide and lime. For percentages of iron oxide in amounts of about 64–88%, balance lime, the mixture is entirely liquid at 1425° C. For lesser proportions of iron oxide extending from 64% down to about 58%, the mixture is dicalcium ferrite in solid state plus a liquid admixture of lime and iron oxide. For iron oxide contents below 58%, balance lime, the mixture at 1425° C. is dicalcium ferrite in solid state plus CaO in solid state, the percentage of lime increasing as the amount of iron is thus reduced thence to 0%. Thus as shown by the diagram there is a critical change at the aforesaid sintering temperature from a solids plus liquid phase of $2CaO \cdot Fe_2O_3$ plus liquid, at an iron oxide content just above 58%, to a completely solid phase of $$2CaO \cdot Fe_2O_3 + CaO$$

at an iron oxide content just below 58%. And at the completely solids phase just below 58% iron oxide, the sintered product is substantially completely that of dicalcium ferrite. It will further be seen from the FIG. 2 diagram that the same is true with respect to sintering temperatures as low as about 1220° C. or 2200° F. which temperature is in fact far too low for the production of a strong and weather-resistant dicalcium ferrite sinter.

For producing dicalcium ferrite in accordance with the present invention the starting mixture is limestone, $CaCO_3$, plus coke, plus iron ore, which latter may be in the form of hematite $Fe_2O_3$, or may be magnetite $Fe_3O_4$, or both, or may be either or both of these with some iron oxide FeO. During the sintering operation the limestone will of course be converted to CaO with evolution of $CO_2$ gas, while any iron originally present as magnetite $Fe_3O_4$ will be converted to hematite $Fe_2O_3$ by oxidation. Thus if sufficient limestone is employed in the intitial admixture as upon reduction thereof to CaO to constitute about 40% of the sintered admixture, the mixture will remain sufficiently solid throughout the sintering operation and produce an end product consisting essentially of dicalcium ferrite in accordance with the invention. To accomplish this result the limestone should constitute about 50–55% by weight of the initial admixture of limestone, coke and ore. If substantially less than this amount of limestone is employed, there will result during the sintering operation the formation of a liquid slag in greater or lesser extent as shown by the phase diagram, which slag as it forms on the moving sinter bed, will clog the sinter bed and result in an inferior or completely useless product.

We claim:

1. The method of producing a sintered product consisting predominantly of dicalcium ferrite, $2CaO \cdot Fe_2O_3$, which comprises admixing iron ore, limestone, water and a solid carbonaceous fuel having a particle size in the range from not more than one-eighth inch to not less than 100 mesh in proportions which provide a mixture consisting essentially of iron ore, said fuel in an amount of about 15–25% by weight of said ore, limestone in an amount determined from the formula:

$$\frac{\text{weight of limestone}}{\text{weight of ore and fuel}} = $$

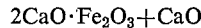

$$\frac{(\% \text{ Fe} - 7 + 1.867\% \text{ SiO}_2 + 1.1\% \text{ Al}_2\text{O}_3 - \% \text{ CaO}) \text{ in ore and fuel mixture}}{(\% \text{ CaO} - \% \text{ Fe} - 1.867\% \text{ SiO}_2 - 1.1\% \text{ Al}_2\text{O}_3) \text{ in limestone}}$$

and water in an amount to provide the desired burning during sintering, and sintering said mixture by igniting and heating said mixture at a temperature in the range from about 2000° F. to about 2800° F. until said product is obtained.

2. The method according to claim 1 wherein said mixture is ignited at temperature of about 2000–2300° F. and thence sintered at temperature of about 2600–2800° F.

3. The method according to claim 1 wherein said iron ore has a particle size ranging from minus one-fourth inch down to fine dust, and wherein said limestone has a particle size ranging from minus one-fourth inch to a minimum of one hundred mesh.

4. The method as set forth in claim 1 wherein said mixture consists essentially of about 50–55% of limestone, about 6–10% of said fuel and about 35–40% iron oxide.

5. The method according to claim 4 wherein said ore has a particle size ranging from minus one-fourth inch down to fine dust and said limestone has a particle size ranging from minus one-fourth inch down to one hundred mesh.

6. The method according to claim 4 wherein said material is sintered at temperature of about 2600–2800° F.

7. The method of producing a sintered product consisting essentially of dicalcium ferrite which comprises: admixing about 50–55% of limestone, 6–10% of a solid carbonaceous fuel having a particle size in the range from not more than one-eighth inch to not less than 100 mesh, 35–40% of iron oxide, each percentage being by weight of the total thereof, and water in an amount to provide the desired burning during sintering, progressively feeding the admixture in a layer of substantially uniform thickness through an ignition zone, igniting the fuel at the surface portion of said layer as it passes through said zone, progressively feeding the layer beyond said zone while continuing the burning of said fuel until the layer has been sintered throughout its depth by combustion of said fuel, and maintaining the temperature of said layer in the range from about 2000° F. to about 2800° F. as it is so fed.

8. The method as set forth in claim 7 wherein the rate at which said layer is fed through said zone is selected to maintain each portion of said layer in said zone for about three minutes and said layer is subjected in said zone to heating to a temperature of about 2000–2300° F. and the temperature of said layer after ignition is maintained in the range from about 2600–2800° F.

9. The method according to claim 7 wherein said limestone has an average particle size exceeding the average particle size of said iron oxide.

10. The method according to claim 7 wherein said iron oxide has a particle size ranging from minus one-fourth inch down to fine dust, and wherein said limestone has a particle size ranging from minus one-fourth inch down to one hundred mesh.

References Cited

UNITED STATES PATENTS 2,159,977  5/1939  Nicholas _____ 75—94 X

FOREIGN PATENTS 59,522  6/1938  Norway.

HERBERT T. CARTER, Primary Examiner

U.S. Cl. X.R.

75—94